W. GRUS, Jr.
SPRING LEAF LUBRICATOR.
APPLICATION FILED AUG. 19, 1914.
Patented June 27, 1916
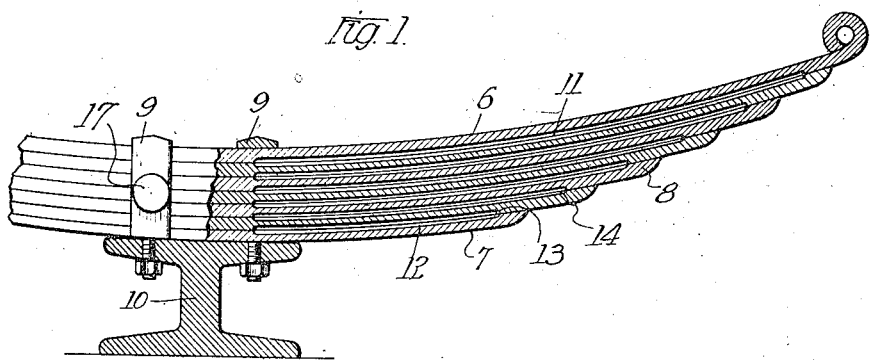
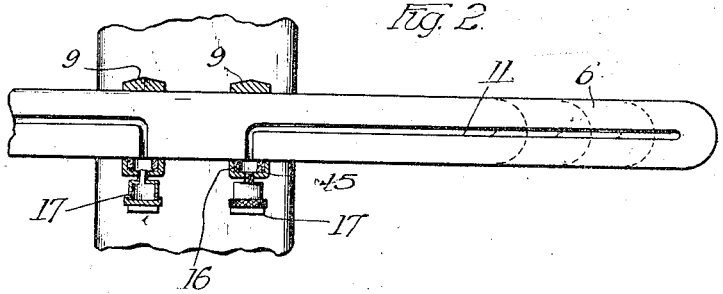
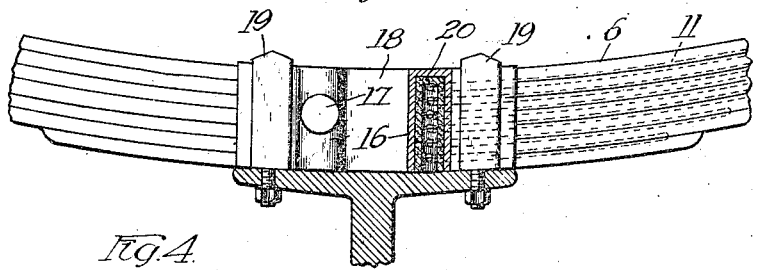
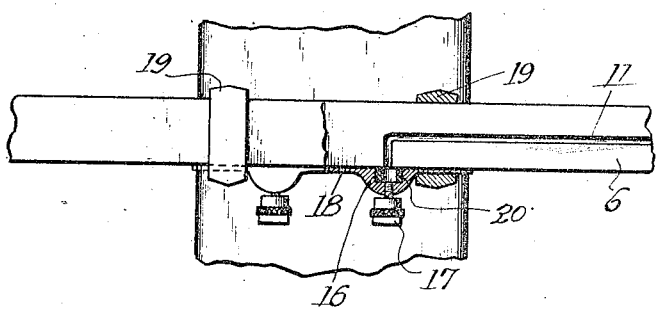
Witnesses:
Robert F. Weir
Arthur W. Carlson
Inventor
William Grus Jr.

UNITED STATES PATENT OFFICE.

WILLIAM GRUS, JR., OF CHICAGO, ILLINOIS, ASSIGNOR TO GRUS LEAF SPRING OILER COMPANY, OF CHICAGO, ILLINOIS, A CORPORATION OF ILLINOIS.

SPRING-LEAF LUBRICATOR.

1,188,441.  Specification of Letters Patent.  Patented June 27, 1916.

Application filed August 19, 1914. Serial No. 857,455.

*To all whom it may concern:*

Be it known that I, WILLIAM GRUS, Jr., a citizen of the United States, residing in Chicago, in the county of Cook and State of Illinois, have invented certain new and useful Improvements in Spring-Leaf Lubricators, of which the following is a specification.

This invention relates to a lubricator which has for its principal object to provide an improved construction for introducing a lubricant between the leaves of a spring and for forcing the lubricant between the leaves.

For the attainment of these ends and the accomplishment of other new and useful objects as will appear, the invention consists in the features of novelty in the construction, combination and arrangement of the several parts generally shown in the accompanying drawings and described in the specification, more particularly pointed out in the appended claims.

In the drawings, Figure 1 is a view partly in section of a spring constructed in accordance with the principles of my invention, to which a lubricator embodying the principles of my invention is attached; Fig. 2 is a view of the spring showing the lubricating ducts and a cross sectional view of the lubricator proper; Fig. 3 is a view showing a lubricator consisting of a plate with lubricating recesses spaced apart thereon, the plate being held in position by the clips which hold the leaves of the spring together; and Fig. 4 is a sectional view of the members shown in Fig. 3.

In the present invention a leaf spring comprising outside leaves 6 and 7 and intermediate leaves 8, is provided with clips 9 for securing the spring to a rail or support 10. The outside leaves 6 and 7 are provided with grooves 11 and 12 on the inside faces only which extend from one side of the leaf in line with each other to a point a short distance from the end of the leaf. Each of the intermediate leaves 8 is provided on one side with a groove 13 which coöperates with the groove of the next lower leaf to form a duct which terminates short of the end of the lower leaf and on the other side with a groove 14 which terminates short of the leaf itself. When the spring is assembled these ducts extend from one side of the edges of the spring to points adjacent the ends thereof. The side openings of the ducts are in line and are covered by the fastening clip 9. Each fastening clip 9 is formed with a recess 15 in which is disposed a perforated piece of pliant material 16, the perforation of which communicates with all of the openings of the ducts at the edges of the leaf. Communicating with the recess 15 and with the perforation of the pliant material 16 is a force feed oil cup 17 of any well-known type which is adapted to force lubricant into the recess 15 and into the space in the perforation of the pliant material 16 and from there through the ducts between the springs.

It will be seen that the ducts extend from points adjacent the center of the spring to both ends thereof so that all the leaves may receive the lubricant throughout their entire length.

Instead of making the spring clips 9 as shown in Figs. 1 and 2 with a recess communicating with the ends of the ducts, a plate 18 may be provided the ends of which are inserted beneath plain or ordinary fastening clips 19. This plate is formed with recesses spaced apart and adapted to communicate with the ducts at the edges of the spring leaves, and as before explained, a perforated piece of pliant material 16 is disposed in each recess with a force feed oil cup 17 on the outside of the plate for forcing lubricant within the recess and into the ducts. The extremities of this plate, or the parts embraced by the clips 19, are preferably made thinner than the remainder of the plate and the plate is held firmly in position against the side of the leaf spring when the clip is fastened in place.

In operation the pliant material prevents the lubricant from exuding from the sides of the clip or of the plate and confines the lubricant to the space of its perforation with which the extremities of the grooves in the spring communicate so that the operation of the force feed cup 17 causes the lubricant to be forced through the grooves to lubricate each of the leaves throughout its length.

What I claim is:

1. The combination of a spring comprising a plurality of superimposed leaves formed with grooves which lead from the edges of the leaves toward the ends thereof, forming ducts when the leaves are superimposed, and means for confining a body of lubricant against a portion of the edges of the leaves in communication with the openings of the ducts.

2. The combination with a spring comprising a plurality of super-imposed leaves, of a casing engaging the spring adapted to contain a lubricant and confine the same against a portion of the leaves of the spring, and corresponding grooves in the super-imposed leaves forming ducts from the sides thereof against which the lubricant is confined.

3. The combination with a spring comprising a plurality of super-imposed leaves of a casing engaging the spring, a perforated piece of pliant material the perforation of which is adapted to contain a lubricant and confine the same against a portion of the edges of the leaves of the spring, the leaves being formed with grooves extending from the edge of the leaves to a point adjacent the ends thereof for directing a lubricant from the casing throughout their length.

4. The combination with a spring comprising a plurality of super-imposed leaves with coöperating grooves extending from the edge to a point adjacent the end of each leaf, the coöperating grooves forming a duct between each pair of leaves, of means for confining a body of lubricant against a portion of the edges of the leaves from which it is directed throughout the length of the leaves.

5. The combination with a spring comprising a plurality of super-imposed leaves each formed with a surface groove extending from one edge to a point adjacent the end and the grooves of each pair of leaves forming a duct, of a casing engaging the spring adapted to contain a lubricant and confine the same against a portion of the edges of the leaves thereof and in communication with the ends of the ducts, and means to inject a lubricant within the casing and to force it therefrom into the ducts.

6. The combination with a spring having a plurality of super-imposed leaves each formed with a groove of a length to coöperate with a similar groove in the leaf above or below it and extending to a distance short of the end of the leaf, the coöperating grooves forming a duct between each pair of leaves and opening in a line at the side of the leaves, and means for confining a body of lubricant against the edge of the leaves in communication with the ducts opening therefrom.

7. The combination with a spring comprising a plurality of super-imposed leaves grooved from one side to a point adjacent the end so that the grooves of adjacent leaves coöperate to form a duct, of a casing, a perforated piece of pliant material disposed in the casing with the perforation in communication with the ducts, and a force feed lubricating cup communicating with the casing for forcing a lubricant into the perforation and into the ducts between the leaves.

8. The combination of the spring comprising a plurality of super-imposed leaves with ducts leading between them from one side of the edges of the leaves, of a plate with a plurality of recesses, a perforated pliant material adapted to be contained in each recess, means to bind the leaves together and to engage the plate and hold it in contact with the edges of the leaves for confining a lubricant within the pliant material, and a force feed cup in connection with each of the recesses from the outside thereof operable to force a lubricant into the perforation of the pliant material and from there into the ducts between the leaves.

In testimony whereof I have signed my name to this specification, in the presence of three subscribing witnesses, on this 17th day of August, A. D. 1914.

WILLIAM GRUS, Jr.

Witnesses:
W. Brown,
H. C. Colby,
J. Hagen.